(12) United States Patent
Shiraishi et al.

(10) Patent No.: US 10,637,107 B2
(45) Date of Patent: Apr. 28, 2020

(54) VEHICLE COMMUNICATION SYSTEM, BATTERY MANAGEMENT DEVICE, CIRCUIT BOARD, BATTERY, AND COMMUNICATION SPECIFICATION SWITCHING METHOD

(71) Applicant: GS Yuasa International Ltd., Kyoto (JP)

(72) Inventors: Takeyuki Shiraishi, Kyoto (JP); Yoshihiko Mizuta, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 16/313,402

(22) PCT Filed: Jul. 6, 2017

(86) PCT No.: PCT/JP2017/024765
§ 371 (c)(1),
(2) Date: Dec. 26, 2018

(87) PCT Pub. No.: WO2018/008714
PCT Pub. Date: Jan. 11, 2018

(65) Prior Publication Data
US 2019/0165433 A1    May 30, 2019

(30) Foreign Application Priority Data
Jul. 7, 2016  (JP) .................................. 2016-135239

(51) Int. Cl.
| *H01M 10/48* | (2006.01) |
| *B60R 16/023* | (2006.01) |
| *B60R 16/033* | (2006.01) |
| *H02J 7/14* | (2006.01) |
| *H01M 10/42* | (2006.01) |
| *B60R 16/02* | (2006.01) |
| *H04L 29/08* | (2006.01) |

(52) U.S. Cl.
CPC ............. *H01M 10/48* (2013.01); *B60R 16/02* (2013.01); *B60R 16/023* (2013.01);
(Continued)

(58) Field of Classification Search
CPC ... H01M 10/48; H01M 10/425; B60R 16/023; B60R 16/033; H02J 7/14; H04L 67/12
(Continued)

(56) References Cited

U.S. PATENT DOCUMENTS 10,111,333 B2    10/2018  Yin et al.
2007/0206034 A1*  9/2007  Nakashima ......... H01M 10/425
                                                        346/107.2
(Continued)

FOREIGN PATENT DOCUMENTS

| JP | 2002-042897 A | 2/2002 |
| JP | 2007-227150 A | 9/2007 |

(Continued)

OTHER PUBLICATIONS

WIPO Application No. PCT/JP2017/024765, PCT International Search Report dated Oct. 10, 2017.

*Primary Examiner* — Kerri L McNally
(74) *Attorney, Agent, or Firm* — Alston & Bird LLP

(57) ABSTRACT

A vehicle communication system includes: a control device 10B provided in a vehicle; and a management device 50 that is provided in a battery 20 mounted on the vehicle while communicably connected to the control device 10B. One of the control device 10B and the management device 50 discriminates a communication specification of the other and switches the communication specification. In this configuration, consistency of the communication specification is attained between the control device 10B of the vehicle and the battery 20, so that disability of communication between the control device 10B and the battery 20 can be prevented.

10 Claims, 11 Drawing Sheets

(52) U.S. Cl.
CPC ........... *B60R 16/033* (2013.01); *H01M 10/42* (2013.01); *H01M 10/425* (2013.01); *H02J 7/14* (2013.01); *H04L 67/12* (2013.01); *H01M 2010/4271* (2013.01); *H01M 2220/20* (2013.01)

(58) Field of Classification Search
USPC ........................................................ 340/455
See application file for complete search history.

(56) References Cited

U.S. PATENT DOCUMENTS

2014/0197790 A1\* 7/2014 Kaneyasu ........... B60L 11/1824
320/109
2014/0277887 A1\* 9/2014 Slattery ................... B60L 1/003
701/22

FOREIGN PATENT DOCUMENTS

| | | | |
|---|---|---|---|
| JP | 2009-163552 | A | 7/2009 |
| JP | 2009163552 | A \* | 7/2009 |
| JP | 2011-113759 | A | 6/2011 |
| JP | 2012-085470 | A | 4/2012 |
| JP | 2012-160010 | A | 8/2012 |
| JP | 2012-222945 | A | 11/2012 |
| JP | 2013-024725 | A | 2/2013 |
| JP | 2013-106391 | A | 5/2013 |
| JP | 2014-203719 | A | 10/2014 |
| WO | WO 2017/131011 | A1 | 8/2017 |
| WO | WO 2018/008714 | A1 | 11/2018 |

\* cited by examiner

Fig. 8

| Pulse width of starting signal | Vehicle manufacturer | Communication specification |
|---|---|---|
| W1 | A company | A type |
| W2 | B company | B type |
| W3 | C company | C type |
| W4 | D company | D type |

VEHICLE COMMUNICATION SYSTEM, BATTERY MANAGEMENT DEVICE, CIRCUIT BOARD, BATTERY, AND COMMUNICATION SPECIFICATION SWITCHING METHOD

CROSS REFERENCE TO RELATED APPLICATIONS

This application is a national stage application, filed under 35 U.S.C. § 371, of International Application No. PCT/JP2017/024765, filed Jul. 6, 2017, which claims priority to Japanese Application No. 2016-135239, filed Jul. 7, 2016, the contents of both which are hereby incorporated by reference in their entirely.

BACKGROUND

Technical Field

The present invention relates to communication between a vehicle and a battery.

For example, Japanese Patent Publication JP-A-2014-203719 describes a battery mounted on a vehicle. The battery is constructed with a plurality of battery cells, a protective circuit, a voltage monitor, a control CPU, and the like. The control CPU is provided in the battery, and controls the charge-discharge voltage of the battery cell.

BRIEF SUMMARY

Sometimes a communication specification between the vehicle and the battery varies depending on a vehicle manufacturer and a vehicle standard. For this reason, when the battery is replaced with a battery except for exclusive goods, sometimes data communication cannot be conducted between the battery and the vehicle due to inconsistency of the communication specification.

The present invention has been made based on the above circumstances, and an object of the present invention is to prevent disability of the communication between the vehicle and the battery due to the inconsistency of the communication specification.

According to one aspect of the present invention, a vehicle communication system includes: a control device provided in a vehicle; and a management device that is provided in a battery mounted on the vehicle while communicably connected to the control device. One of the control device and the management device discriminates a communication specification of the other and switches the communication specification. The "communication specification" is intended to be a specification of a communication protocol, such as a data format, a contract, and a procedure, which performs the communication between the control device and the management device.

According to the present invention, the disability of the communication between the vehicle and the battery due to the inconsistency of the communication specification can be prevented.

BRIEF DESCRIPTION OF THE FIGURES

FIG. 8 is a view illustrating a selection table of a communication specification.

DETAILED DESCRIPTION OF VARIOUS EMBODIMENTS

Figure 1:
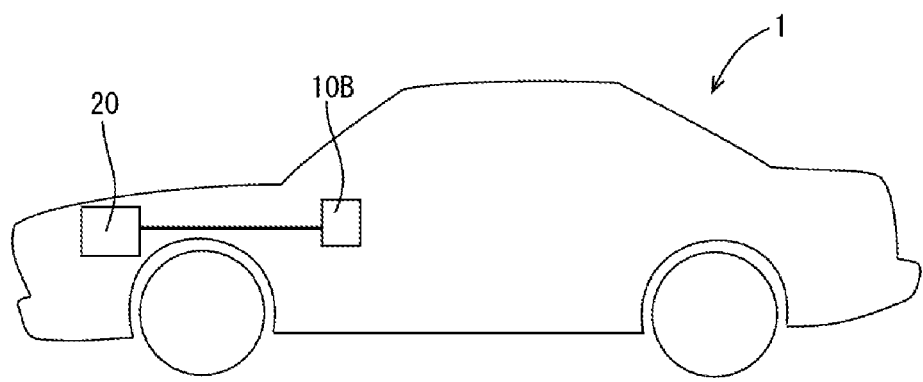
FIG. 1 is a side view illustrating a vehicle applied to a first embodiment.

An outline of a vehicle communication system disclosed in an embodiment will be described below.

A vehicle communication system includes: a control device provided in a vehicle; and a management device that is provided in a battery mounted on the vehicle while communicably connected to the control device. One of the control device and the management device discriminates a communication specification of the other and switches the communication specification. In this configuration, consistency of the communication specification is attained between the vehicle and the battery, so that the disability of the communication between the vehicle and the battery can be prevented. The "communication specification" is intended to be a specification of a communication protocol, such as a data format, a contract, and a procedure, which performs the communication between the control device and the management device.

In the vehicle communication system, one of the control device and the management device discriminates the communication specification based on a discrimination signal output from the other. In this configuration, the communication specification is discriminated using the signal, so that neither the control device nor the management device has a newly added component.

In the vehicle communication system, the discrimination signal is a signal having a different pulse width or a different number of pulses according to the communication specification. In this configuration, the communication specification can be discriminated by detecting the difference of the pulse width or the number of pulses.

In the vehicle communication system, the management device discriminates the communication specification of the vehicle based on the discrimination signal output from the control device of the vehicle, and switches the communication specification. In this configuration, the communication specification is switched on the battery side, so that the battery can commonly be used between vehicles having different communication specifications.

In the vehicle communication system, the control device transmits a starting signal to the management device during the vehicle starting, and the starting signal is the discrimination signal of the pulse width or the number of pulses according to the communication specification of the vehicle. In this configuration, the communication specification can be switched immediately after the vehicle starting, and time during which communication cannot be conducted after the vehicle starting can be shortened.

In the vehicle communication system, the management device switches a monitoring mode of the battery from a pause mode to a normal mode on condition that the management device receives a starting signal output from the control device during the vehicle starting, and the control device transmits the discrimination signal to the management device later than transmission timing of the starting signal. In this configuration, after transition to the normal mode, the management device receives the discrimination signal, and discriminates the communication specification. For this reason, the communication specification can accurately be discriminated as compared with the case of discriminating the communication specification in the pause mode.

In the vehicle communication system, after the communication specification is switched, the management device specifies control performed by the vehicle in data communication with the control device, and monitors a state of the energy storage device according to a specified control content. In this configuration, the state of the battery can be monitored according to the control performed by the vehicle.

First Embodiment

A first embodiment of the present invention will be described below with reference to FIGS. 1 to 9.

1. Description of Battery

Figure 2:
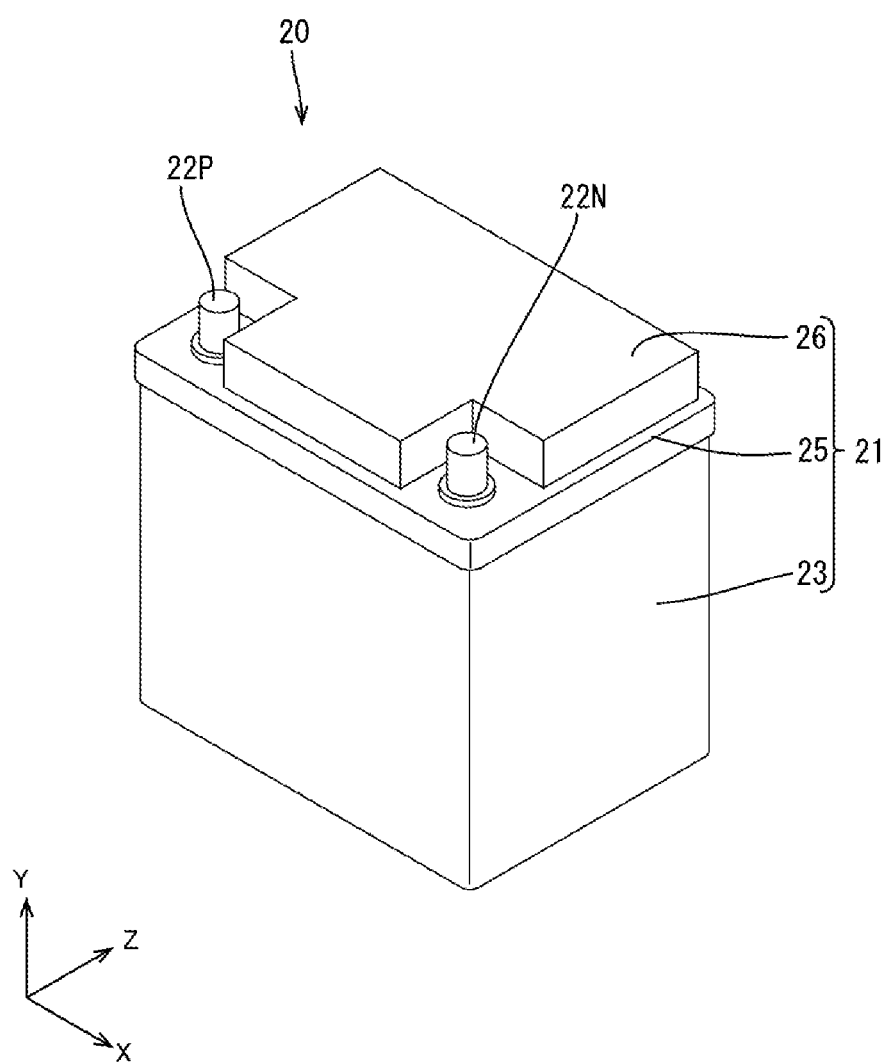
FIG. 2 is a perspective view of a battery.
Figure 3:
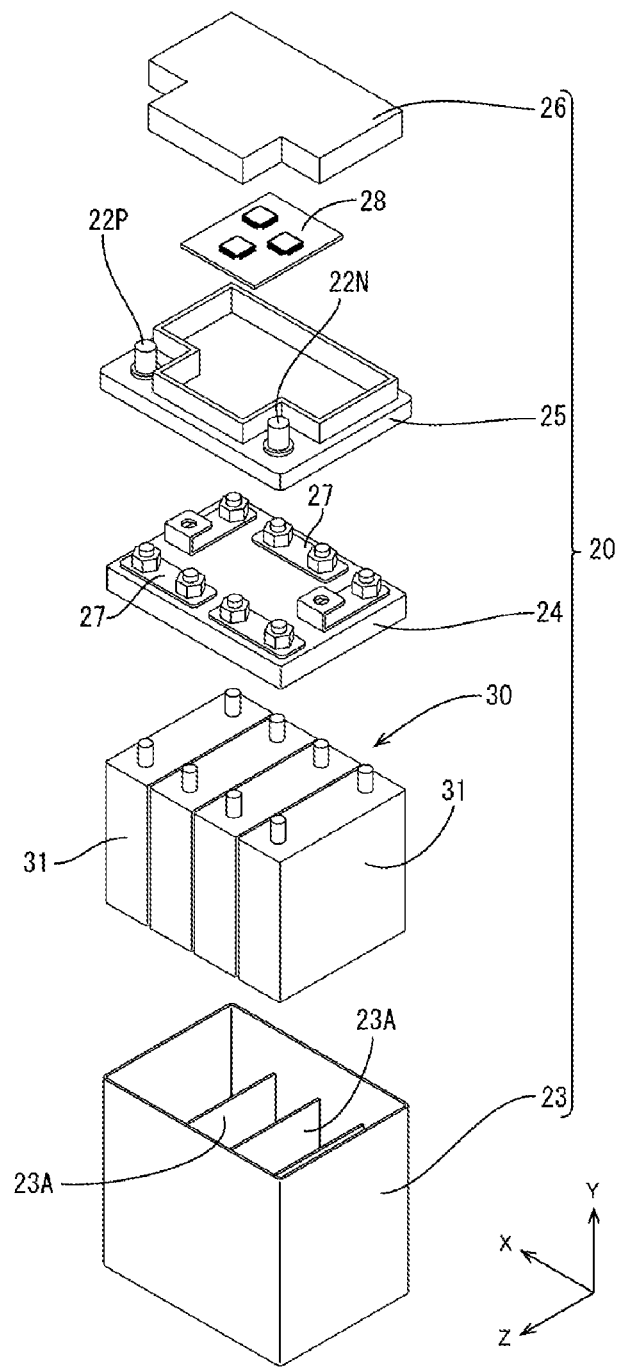
FIG. 3 is an exploded perspective view of the battery.
Figure 4:
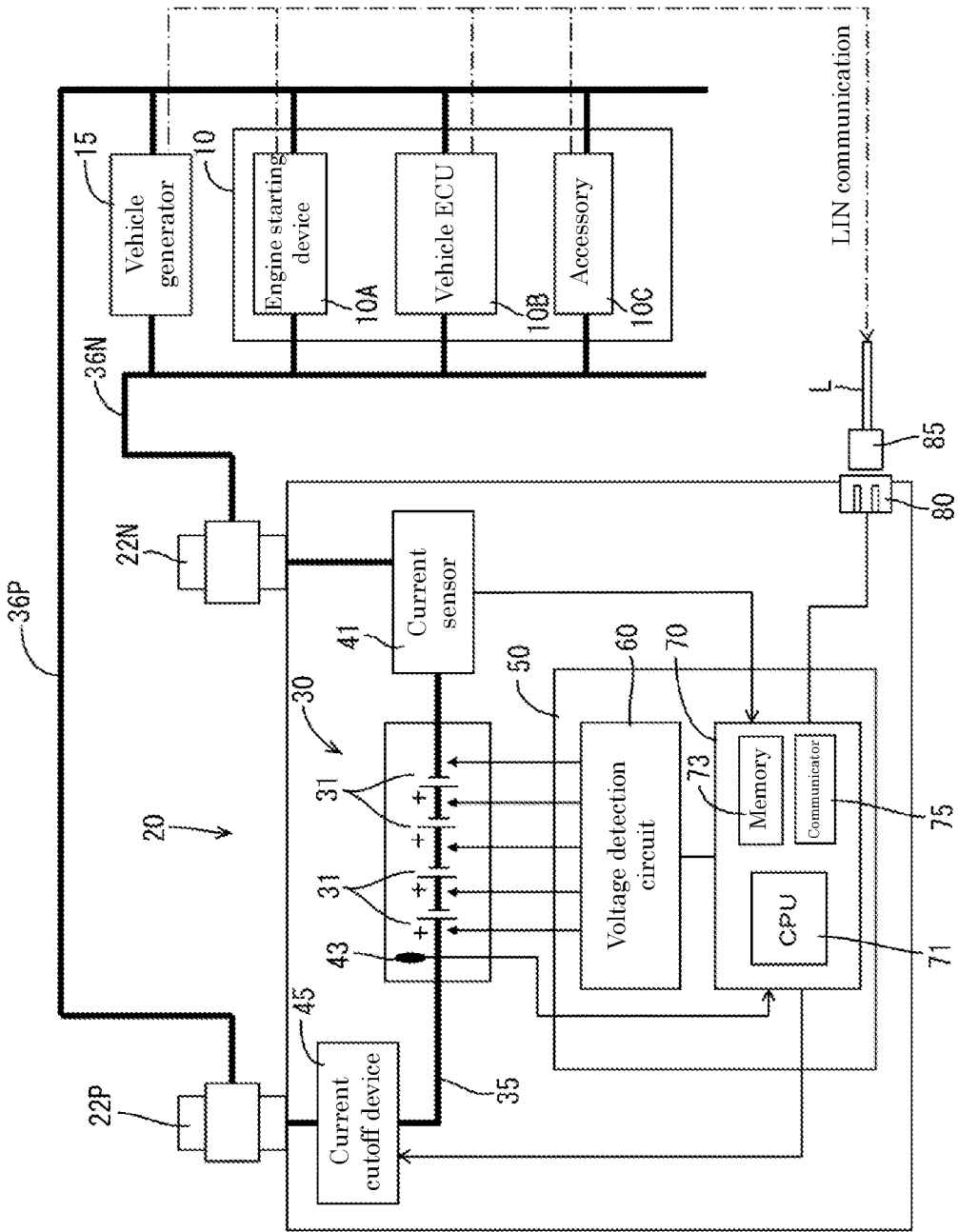
FIG. 4 is a block diagram illustrating an electric configuration of the battery.

FIG. 1 is a side view of a vehicle, FIG. 2 is a perspective view of a battery, FIG. 3 is an exploded perspective view of the battery, and FIG. 4 is a block diagram illustrating an electric configuration of the battery.

As illustrated in FIG. 1, a vehicle 1 includes a battery 20. As illustrated in FIG. 2, the battery 20 includes a block-shaped battery case 21 in which an assembled battery 30 constructed with a plurality of secondary batteries 31 and a circuit board 28 are accommodated. Hereinafter, in the case that FIGS. 2 and 3 are referred to, a vertical direction of the battery case 21 when the battery case 21 is horizontally placed without tilting with respect to an installation surface is defined as a Y direction, a direction along a long-side direction of the battery case 21 is defined as an X direction, and a depth direction of the battery case 21 is defined as a Z direction.

As illustrated in FIG. 3, the battery case 21 includes a box-shaped case body 23 opened upward, a positioning member 24 that positions the plurality of secondary batteries 31, an inner lid 25 mounted on the case body 23, and an upper lid 26 mounted on a top of the inner lid 25. As illustrated in FIG. 3, a plurality of cell chambers 23A in each of which the secondary battery 31 is separately accommodated are arranged in the X direction in the case body 23.

As illustrated in FIG. 3, a plurality of bus bars 27 are arranged on an upper surface of the positioning member 24, and the positioning member 24 is disposed above the plurality of secondary batteries 31 arranged in the case body 23, whereby the plurality of secondary batteries 31 are positioned and connected in series by the plurality of bus bars 27.

As illustrated in FIG. 2, the inner lid 25 has a substantially rectangular shape in planar view, and has a shape with a height difference in the Y direction. A pair of terminals 22P, 22N to which harness terminals (not illustrated) are connected is provided at both ends in the X direction of the inner lid 25. The pair of terminals 22P, 22N is made of metal such as lead alloy, the terminal 22P is a positive electrode-side terminal, and the terminal 22N is a negative electrode-side terminal.

As illustrated in FIG. 3, the inner lid 25 can accommodate the circuit board 28 therein, and the secondary battery 31 and the circuit board 28 are connected to each other by mounting the inner lid 25 on the case body 23.

An electric configuration of an electric load 10 and the battery 20 of the vehicle 1 will be described below with reference to FIG. 4. The electric load 10 of the vehicle 1 includes an engine starting device 10A such as a cell motor, a vehicle ECU (Electronic Control Unit) 10B that controls each component of the vehicles 1, and an accessory 10C. The accessory 10C includes a headlight, a car interior light, an audio, a clock, and a security device. The vehicle ECU 10B corresponds to the "control device" of the present invention.

These electric loads 10 are connected to the battery 20 and a vehicle generator 15 through a power supply line 36P and a ground line 36N, and electric power is supplied from the battery 20 and the vehicle generator 15. That is, when the vehicle generator 15 is not generating electricity, such as parking or stopping (including idling stop), the electric power is supplied from the battery 20. For example, when electric power generation exceeds the load while the vehicle travels, the electric power is supplied from the vehicle generator 15, and the battery 20 is charged with the surplus electric power. When the electric power generation is lower than the load, the electric power is supplied from not only the vehicle generator 15 but also the battery 20 in order to compensate for insufficiency of the electric power generation.

The battery 20 includes the assembled battery 30, a current sensor 41, a temperature sensor 43, a current cutoff device 45, a management device 50 that manages the assembled battery 30, and a communication connector connection unit 80. The assembled battery 30 is constructed with a plurality of lithium ion secondary batteries (an example of the "energy storage device" of the present invention) 31 connected in series.

The assembled battery 30, the current sensor 41, and the current cutoff device 45 are connected in series through a connection line 35. In the first embodiment, the current sensor 41 is disposed on the negative electrode side and the current cutoff device 45 is disposed on the positive electrode side, the current sensor 41 is connected to the negative electrode-side terminal 22N, and the current cutoff device 45 is connected to the positive electrode-side terminal 22P.

The current sensor 41 is provided in the battery case 21, and performs a function of detecting current passed through the secondary battery 31. The temperature sensor 43 is a contact type or a non-contact type, and performs a function of measuring a temperature [° C.] at the secondary battery 31.

The current sensor 41 and the temperature sensor 43 are electrically connected to the management device 50 through a signal line, and the detection values of the current sensor 41 and the temperature sensor 43 are taken into the management device 50.

The current cutoff device 45 is provided in the battery case 21. The current cutoff device 45 is a semiconductor switch such as an FET or a relay. the current cutoff device 45 releases the positive electrode-side power line 35 in response to a command (control signal) from the management device 50, thereby performing a function of cutting off the current of the secondary battery 31.

The communication connector connection unit 80 is provided on an outer surface of the case body 23. The management device 50 has a structure in which the management device 50 is communicably connected to the vehicle ECU 10B through a communication line (LIN bus) L by connecting the communication connector 85 to the communication connector connection unit 80.

The management device 50 includes a voltage detection circuit 60 and a data processor 70, and is provided on the circuit board 28. The voltage detection circuit 60 is connected to both ends of each secondary battery 31 through a detection line, and performs a function of measuring the voltage of each secondary battery 31 and the total voltage of the assembled battery 30 in response to an instruction from the data processor 70.

The data processor 70 includes a Central Processing Unit (CPU) 71, a memory 73, and a communicator 75. The CPU 71 monitors the current, voltage, and temperature of the secondary battery 31 from outputs of the current sensor 41, the voltage detection circuit 60, and the temperature sensor 43. When an abnormality is detected, the CPU 71 activates the current cutoff device 45 to prevent the secondary battery 31 from becoming a dangerous state. The CPU 71 communicates with the vehicle ECU 10B through the communicator 75.

2. Communication Specification of Vehicle Network

Figure 5:
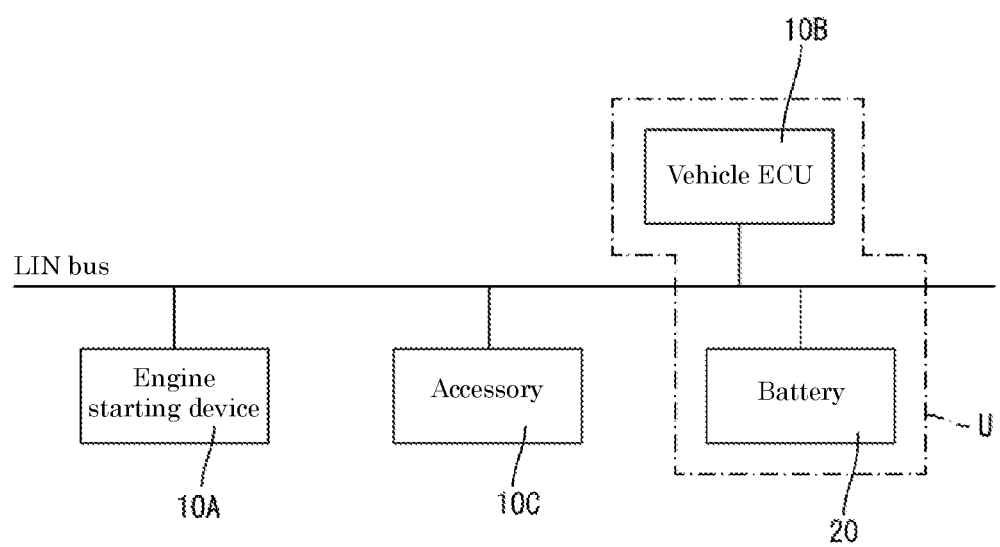
FIG. 5 is a view illustrating a network configuration of the vehicle.
Figure 6:
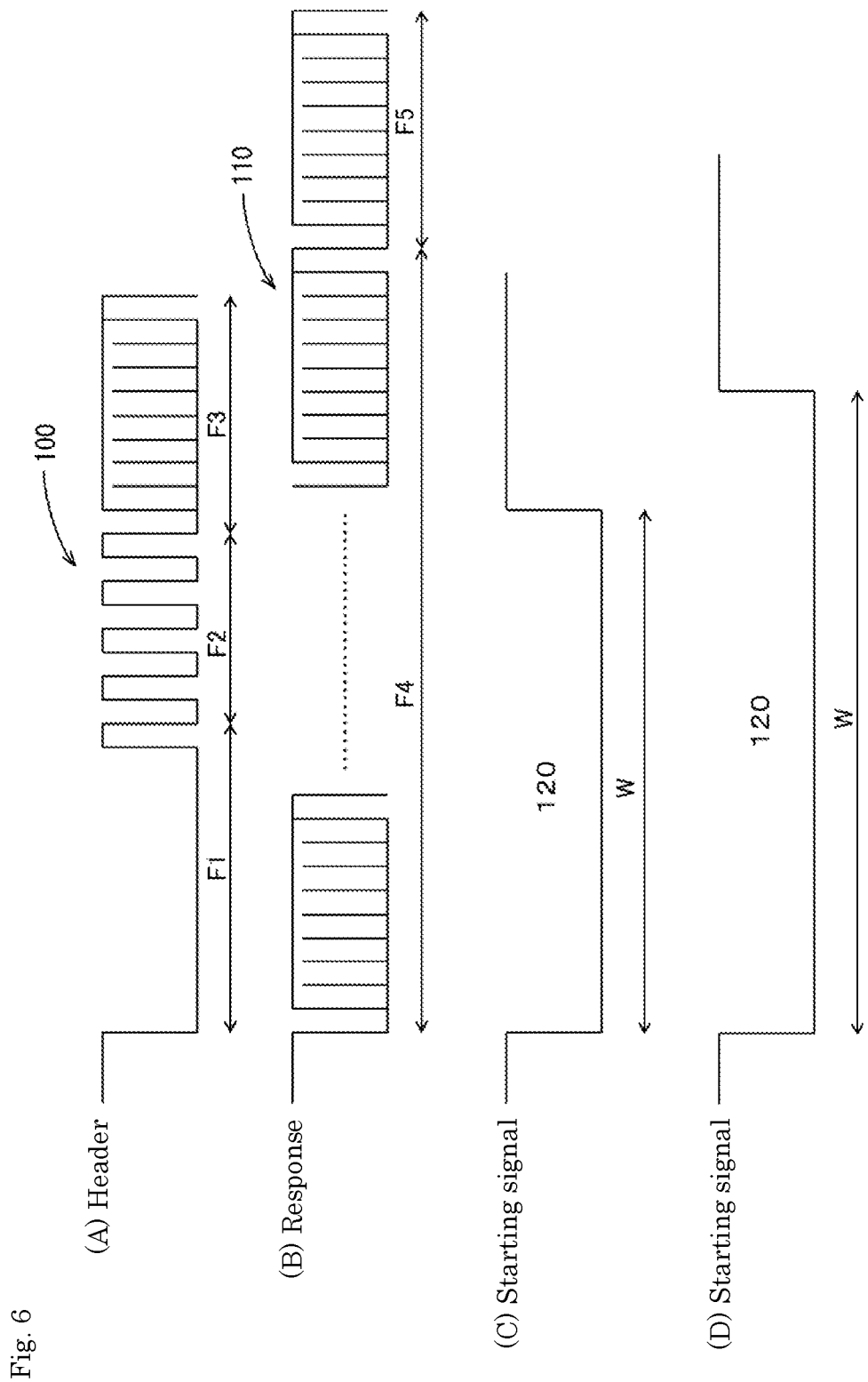
FIG. 6 is a view illustrating a frame, a response, and a starting signal.

As illustrated in FIG. 5, the vehicle ECU 10B is connected to the engine starting device 10A mounted on the vehicle, each accessory 10C, and the battery 20 through the LIN bus. The vehicle ECU 10B conducts serial communication with the engine starting device 10A, each accessory 10C, and the battery 20 by a LIN (Local Interconnect Network) communication protocol. Hereinafter, the serial communication by the LIN communication protocol is referred to as LIN communication. The vehicle ECU 10B and the management device 50 of the battery 20 correspond to the vehicle communication system U of the present invention.

The LIN communication is a master-slave system communication, and the vehicle ECU 10B as a master node is configured to control specific in-vehicle electronic devices including the battery 20, the vehicle generator 15, the engine starting device 10A, and the accessory 10C. In the LIN communication, a "header 100" in FIG. 6(A) and a "response 110" in FIG. 6(B) constitute one frame (that is, one message).

As illustrated in FIG. 6(A), the "header 100" is constructed with three parts of a break field F1, a synchronization field F2, and an ID field F3, and is transmitted from the vehicle ECU 10B as the master node to the LIN bus.

The break field F1 is a field in which a signal level becomes a dominant level for a predetermined period, and is provided in order to cause the engine starting device 10A, each accessory 10C, and the battery 20, which are slave nodes, to recognize start of the header 100.

"Dominant" means "zero" of logic, and is a low level in voltage. "Recessive" means "1" of logic, and is a high level in voltage.

The synchronization field F2 is a field in which a synchronization signal is transmitted. In the synchronization field F2, each slave node is provided in order to correct synchronization with the vehicle ECU 10B as the master node. The ID field F3 is a field in which ID information about the header 100 is transmitted.

The ID information is an identifier of the header 100, and pieces of information (1) to (3) are previously associated in order to determine a communication partner or a communication content.

(1) Information about the slave node that becomes the communication partner (2) Data content transmitted to and received from the slave that becomes the communication partner (3) Information whether a request to transmit data or a request to receive data is made to the slave node For example, in a "01" number of the ID information, "battery" is assigned as the slave node that becomes the communication partner, and "request to transmit voltage and current of secondary battery" is assigned as the data content to be communicated.

When receiving the "header 100" transmitted from the vehicle ECU 10B as the master node, each slave node connected to the LIN bus determines the pieces of information (1) to (3) from the ID information included in the "header 100".

In the case that the data transmission from the slave node is requested, the "response 110 having the data field F4" is transmitted from the specific slave node as the communication partner through the LIN bus. The data requested by the vehicle ECU 10B is written in the data field F4 of the response 110 by the specific slave node as the communication partner, and the vehicle ECU 10B can receive the necessary data from the specific slave node as the communication partner by receiving the response 110.

On the other hand, in the case that the data reception is requested to the slave node, the "response 110 having the data field F4" is transmitted from the vehicle ECU 10B as the master node through the LIN bus. The data to be transmitted by the vehicle ECU 10B is written in the data field F4 of the response 110, and the specific slave node as the communication partner can receive the necessary data from the vehicle ECU 10B by receiving the response 110.

In the above example, when the frame 100 of the "01" number of the ID information is transmitted from the vehicle ECU 10B through the LIN bus, the battery 20 stores the "voltage and current data of the secondary battery 31" in the data field F4 and returns the response 110, which allows the vehicle ECU 10B to receive the "voltage and current data of the secondary battery 31".

As described above, in the LIN communication, the necessary information such as the communication partner and data content is determined from the ID information included in the "header 100", and serial communication is conducted between the vehicle ECU 10B and the specific slave node (that is, the engine starting device 10A, the accessory 10C, and the battery 20). The numeral F5 in FIG. 6(B) is a field in which a chuck sum checking whether the data can accurately be received is written.

3. Vehicle State Detection and Battery Monitoring Mode

Figure 7:
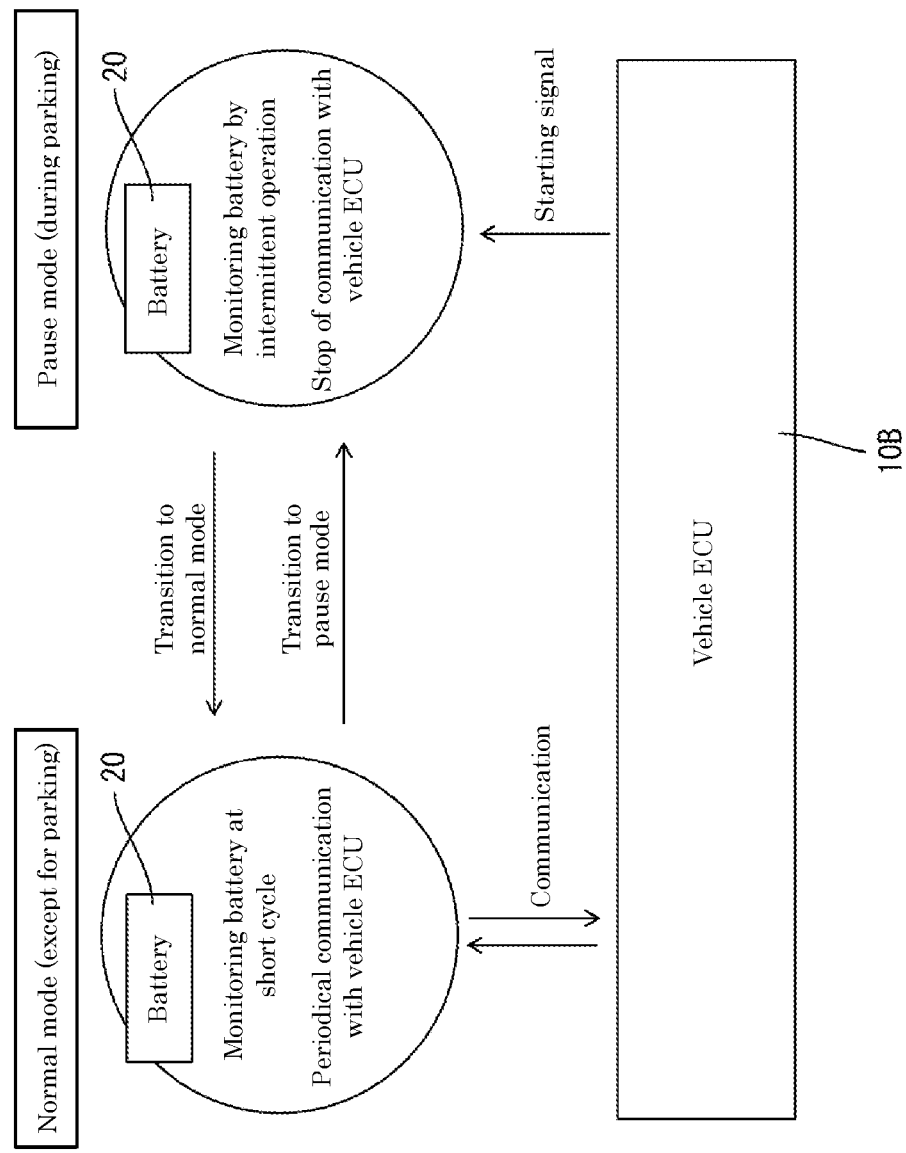
FIG. 7 is a transition diagram of an operation mode in a monitoring mode.

As illustrated in FIG. 7, two monitoring modes of a "normal mode" and a "pause mode" are set in the battery 20, and the management device 50 switches the monitoring mode according to the state of the vehicle.

Specifically, the vehicle ECU 10B detects whether the vehicle is in a parking state or a normal state based on the state of an IG switch or an engine, an opening and closing state of a door, the state of the LIN communication, and the like. The vehicle ECU 10B transmits a "starting signal 120" to the battery 20 during the vehicle starting in which the vehicle transitions from the parking state to the normal state. The normal state refers to states except for the parking state, such as a running preparation state, a running state, and a stop state.

When receiving the starting signal 120 from the vehicle ECU 10B, the management device 50 determines that the vehicle is in the normal state, and switches the monitoring mode to the normal mode. During the normal mode, the management device 50 monitors the battery 20 at a predetermined short cycle, and transmits information to the vehicle ECU 10B by LIN communication.

On the other hand, the vehicle ECU 10B stops the LIN communication when the vehicle transitions from the normal state to the parking state. When the state in which the LIN communication with the vehicle ECU 10B stops for a predetermined period of time is continued, the management device 50 determines that the vehicle is in the parking state, and switches the monitoring mode to the pause mode. During the pause mode, the management device 50 singly monitors the battery 20 at a predetermined long cycle, and the LIN communication with the vehicle ECU 10B is maintained in the stop state. In this way, when the vehicle is in the parking state, the management device 50 singly monitors the battery 20 at a predetermined long cycle, so that low power consumption of the battery 20 can be achieved.

As illustrated in FIGS. 6(C) and 6(D), the starting signal 120 transmitted from the vehicle ECU 10B to the battery 20 during the vehicle starting is a pulse signal in which a signal level becomes a dominant level for a predetermined period.

4. Discrimination and Switching Processing of Communication Specification

A vehicle network conducts the LIN communication. However, sometimes the communication specification conforming to the LIN communication varies among vehicle manufacturers. For example, in the LIN communication, the communication partner or the communication content is determined based on the ID information about the header 100. However, sometimes the information about the communication partner or the communication content assigned to each piece of ID information (the pieces of information (1) to (3)) varies in each vehicle manufacturer.

In order to use the battery 20 that is not exclusive goods of the vehicle manufacturer, it is necessary to discriminate the communication specification of the vehicle manufacturer conforming to the LIN communication, and to switch the communication specification to the communication specification compatible with the vehicle manufacturer. That is, in the above example, it is necessary to discriminate the specification of the ID information adapted by the vehicle manufacturer side, and to switch the specification to the specification of the ID information compatible with the vehicle manufacturer on the side of the battery 20. During the vehicle starting, using the starting signal 120 transmitted from the vehicle ECU 10B to the battery 20, the communication specification conforming to the LIN communication is switched by detecting a difference of a pulse width W.

More specifically, the pulse width W of the starting signal 120 transmitted from the vehicle ECU 10B to the management device 50 is decided as a different value in each vehicle manufacturer. On the other hand, a communication specification selection table in FIG. 8 is provided in the memory 73 of the management device 50. In the communication specification selection table, the information about the vehicle manufacturer and the communication specification conforming to the LIN communication adopted by the vehicle manufacturer are stored while correlated with the pulse width W of the starting signal 120.

In the example of FIG. 8, four-type data of an A type to a D type adopted by each vehicle manufacturer is stored as data of the communication specification conforming to LIN communication information about four companies A to D that is information about the vehicle manufacturer.

The communication specification switching procedure performed by the management device 50 will be described below with reference to FIG. 9. At this point, it is assumed that after battery replacement, the starting signal 120 is output to the replaced battery 20 from the vehicle ECU 10B in response to the initial starting of the vehicle.

When receiving the starting signal 120 from the vehicle ECU 10B (S10), the data processor 70 of the management device 50 performs processing of detecting the pulse width W of the starting signal 120 (S20). The data processor 70 performs processing of referring the detected pulse width W to the selection table in FIG. 8 to discriminate the vehicle manufacturer and the communication specification (S30).

For example, when the starting signal 120 has the pulse width of W1, the vehicle manufacturer is the "A company", and the communication specification conforming to the vehicle can be discriminated as "A type conforming to LIN communication". In this case, the data processor 70 of the management device 50 selects the communication specification of the "A type conforming to LIN communication" from the four patterns of communication specifications stored in the selection table of the memory 73, and switches the communication specification to the communication specification of the "A type conforming to LIN communication" (S40). Consequently, the consistency of the communication specification conforming to the LIN communication, such as the specification of the ID information about the header 100, is attained between the vehicle 1 and the replaced battery 20, so that the LIN communication (data communication) can be conducted between the vehicle ECU 10B and the battery 20.

When the starting signal 120 has the pulse width of W2, the vehicle manufacturer is the "B company", and the communication specification conforming to the vehicle can be discriminated as "B type conforming to LIN communication". In this case, the data processor 70 of the management device 50 selects the communication specification of the "B type conforming to LIN communication" from the four patterns of communication specifications stored in the selection table of the memory 73, and switches the communication specification to the communication specification of the "B type conforming to LIN communication" (S40). Consequently, the consistency of the communication specification conforming to the LIN communication, such as the specification of the ID information about the header 100, is attained between the vehicle 1 and the replaced battery 20, so that the LIN communication (data communication) can be conducted between the vehicle ECU 10B and the battery 20.

Figure 9:
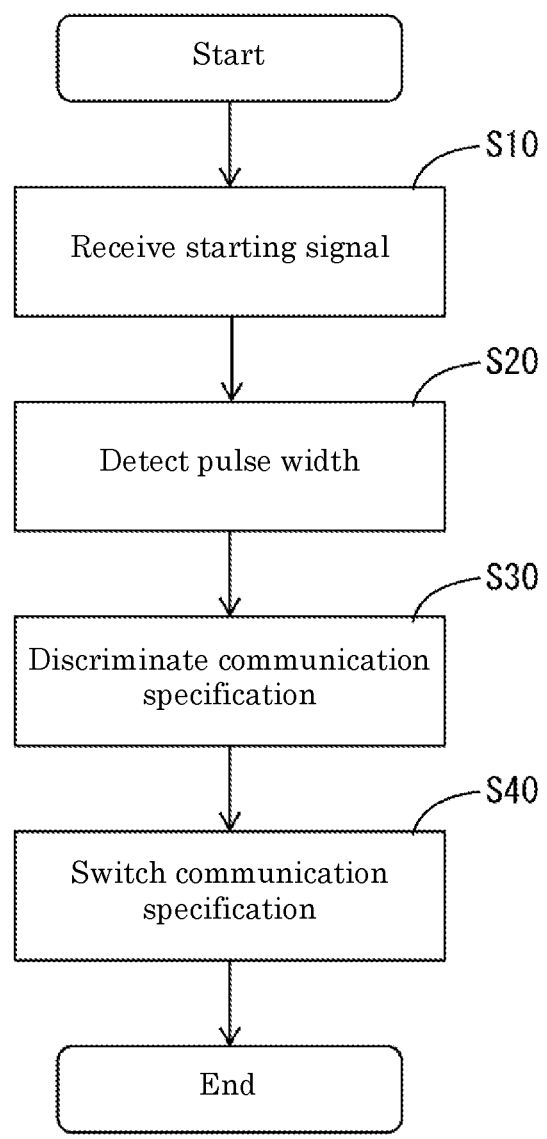
FIG. 9 is a flowchart illustrating a flow of processing performed by a BM after the starting signal is received.

The communication specification switching processing in FIG. 9 may be performed every time the management device 50 receives the starting signal 120 in addition to the initial time after the battery replacement. However, when the communication specification switching processing is performed once just after the battery replacement, the communication specification will not be inconsistent unless the battery is replaced again. For this reason, the communication specification switching processing may be performed only at the first time after the battery replacement.

5. Effect

As described above, the management device 50 discriminates the communication specification of the vehicle, and switches the communication specification to the communication specification matched with the communication specification of the vehicle, so that the LIN communication can be conducted between the management device 50 and the replaced battery 20 even if the replaced battery 20 is not exclusive goods of the vehicle 1. Because the communication specification is discriminated using the signal, neither the vehicle ECU 10B nor the management device 50 has a newly added component.

In this configuration, the vehicle manufacturer and the communication specification are discriminated using the starting signal 120 output from the vehicle ECU 10B during the vehicle starting. Consequently, the communication specification can be switched immediately after the vehicle starting, and the time during which the communication cannot be conducted after the vehicle starting can be shortened.

In this configuration, the communication specification is switched on the side of the battery 20, so that the battery 20 can commonly be used between vehicles having different communication specifications. Consequently, compared to the case that a dedicated battery is provided in each vehicle having different communication specification, it is superior in terms of management, and there is also cost merit. That is, in this configuration, there is a merit that a product (battery 20) does not need to be prepared in each communication specification even if the communication specification is different.

Second Embodiment

Figure 10:
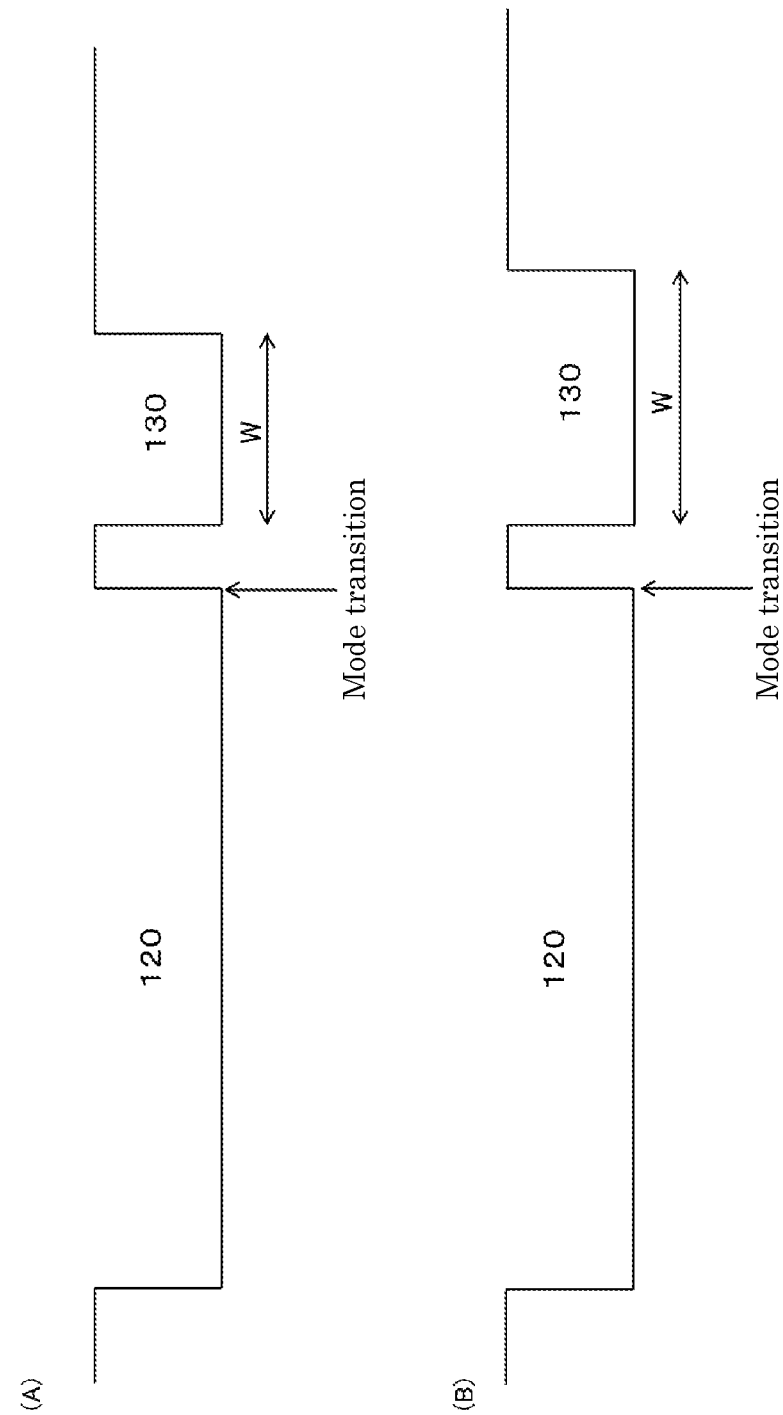
FIG. 10 is a view illustrating a discrimination signal in a second embodiment.

A second embodiment of the present invention will be described below with reference to FIG. 10.

In the first embodiment, by way of example, the communication specification is switched by detecting the difference of the pulse width W of the starting signal 120 transmitted from the vehicle ECU 10B during the vehicle starting. In the second embodiment, during the vehicle starting, the starting signal 120 is transmitted from the vehicle ECU 10B to the management device 50, and a discrimination signal 130 having a different pulse width W is output according to the communication specification of the vehicle manufacturer later than the transmission timing of the starting signal 120 as illustrated in FIGS. 10(A) and 10(B). On the side of the management device 50, the difference of the pulse width W of the discrimination signal 130 is detected to switch the communication specification.

Because the monitoring mode is switched from the pause mode to the normal mode after the starting signal 120 is received, the management device 50 performs processing of receiving the discrimination signal 130 to detect the pulse width W in this configuration after the transition to the normal mode. Consequently, the pulse width W can accurately be detected as compared with the case that the pulse width W is detected during the pause mode. Thus, the communication specification of the vehicle can accurately be discriminated, and a switching mistake of the communication specification due to erroneous recognition of the pulse width W can be prevented.

Third Embodiment

Figure 11:
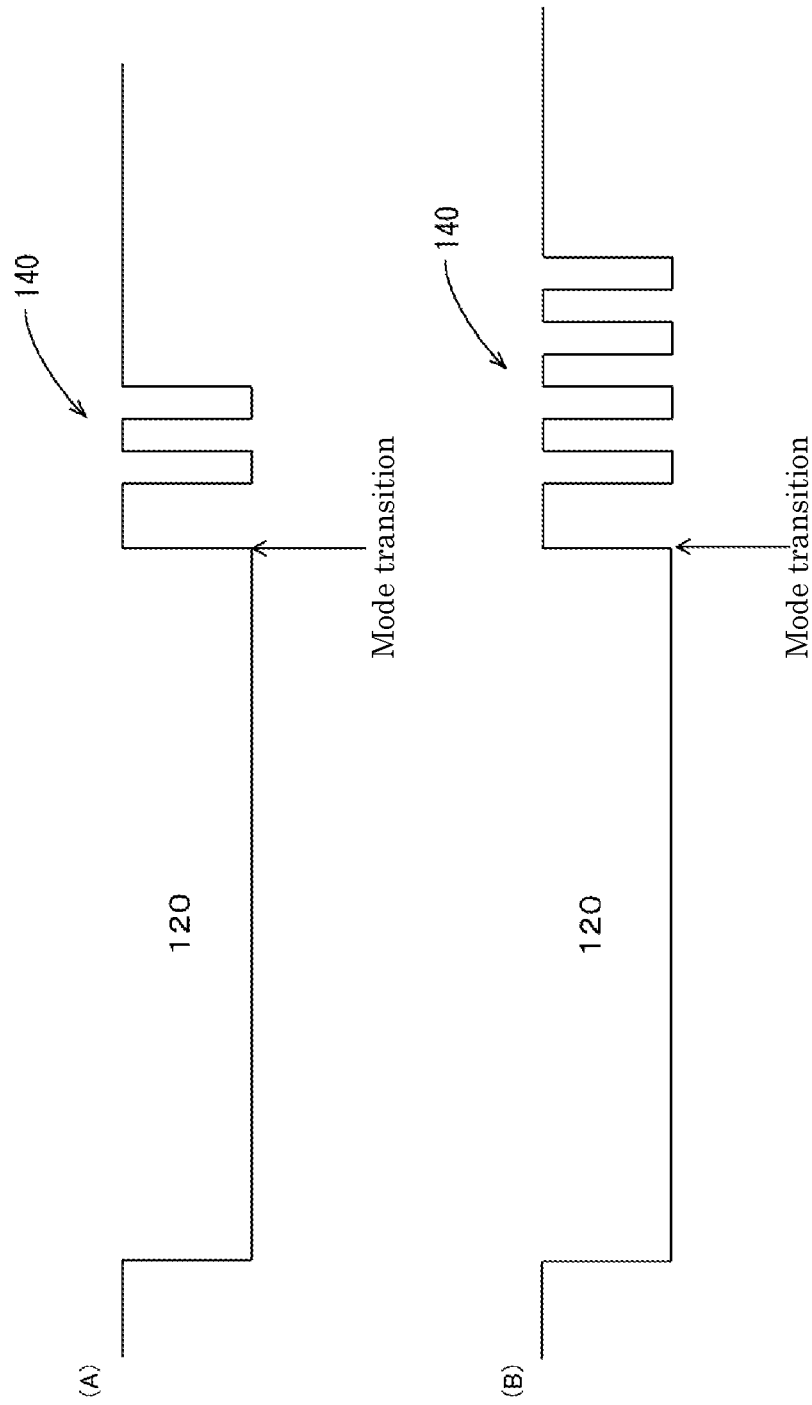
FIG. 11 is a view illustrating a discrimination signal in a third embodiment.

A third embodiment of the present invention will be described below with reference to FIG. 11.

In the second embodiment, during the vehicle starting, the starting signal 120 is transmitted from the vehicle ECU 10B to the management device 50, and a discrimination signal 130 having a different pulse width is output according to the communication specification of the vehicle manufacturer later than the transmission timing of the starting signal 120. In the third embodiment, as illustrated in FIGS. 11(A) and 11(B), a discrimination signal 140 having the different number of pulses is output according to the communication specification of the vehicle manufacturer later than the transmission timing of the starting signal 120. On the side of the management device 50, the difference of the number of pulses of the discrimination signal 140 is detected to switch the communication specification.

For the third embodiment, as in the second embodiment, the management device 50 performs the processing of receiving the discrimination signal 140 to detect the number of pulses after the transition to the normal mode. Consequently, the number of pulses can accurately be detected as compared with the case that the number of pulses is detected during the pause mode. Thus, the communication specification of the vehicle can accurately be discriminated, and the switching mistake of the communication specification due to the erroneous recognition of the number of pulses can be prevented.

Fourth Embodiment

A fourth embodiment of the present invention will be described below.

In the fourth embodiment, after the switching of the communication specification, charge control of the battery 20 performed by the vehicle is specified, and the state of the battery 20 is monitored during charge.

Specifically, when switching the communication specification by performing S10 to S40 in FIG. 9, the management device 50 performs processing of specifying the charge control of the battery 20 performed by the vehicle by the LIN communication with the vehicle ECU 10B. The charge control of the battery 20 performed by the vehicle is charge control of the battery 20 performed by the in-vehicle vehicle generator 15. In the fourth embodiment, the target charge voltage, the charge current, and the like are specified as the content of the charge control.

Then, the management device 50 monitors the state of the battery 20 according to the specified charge control content of the battery 20. That is, the charge current of the assembled battery 30 is monitored from the output of the current sensor 41 to monitor whether the charge current is proper. The total voltage of the assembled battery 30 is monitored from the output of the voltage detection circuit 60, and the charge state of the battery 20 is monitored.

When an abnormality is generated in the charge current or when the total voltage of the assembled battery 30 reaches a vicinity of the target charge voltage, the vehicle ECU 10B is notified of the information through the LIN communication. Consequently, the vehicle ECU 10B can take measures such as adjustment of the charge current when the abnormality is generated in the charge current. When the total voltage reaches the vicinity of the target charge voltage, the battery 20 can be charged by adjustment of the subsequent charge voltage so as not to exceed the target charge voltage.

In this configuration, the management device 50 monitors the state of the battery 20 according to the charge control content of the battery 20 performed by the vehicle and notifies the result to the vehicle ECU, so that the charge control of the battery 20 can be performed with high accuracy.

Other Embodiments

The present technology is not limited to the embodiments described by the above description and drawings, but the following embodiments are also included in the technical scope of the present invention.

(1) In the first to fourth embodiments, by way of example, the specification of the ID information is switched as the communication specification conforming to the LIN (Local Interconnect Network) communication. Alternatively, the specification of data length of the response 110 may be switched. In addition to the communication specification conforming to the LIN communication, for example, the communication specification conforming to CAN (Controller Area Network) communication may be switched. The communication protocol between the vehicle ECU 10B and the management device 50 is not limited to LIN or CAN, but the communication specification conforming to another communication protocol may be switched. As the communication specification, a type of the communication protocol such as LIN or CAN may be discriminated to switch the communication protocol.

(2) In the first to fourth embodiments, the vehicle ECU 10B transmits the signal discriminating the communication specification to the battery 20, and the communication specification is switched by the battery 20. Additionally, the signal discriminating the communication specification may be transmitted from the battery 20 to the vehicle ECU 10B, and the communication specification may be switched by the vehicle ECU 10B.

(3) In the first to fourth embodiments, by way of example, the vehicle manufacturers are different from each other in the communication specification. However, the present technology is not limited to this configuration, but can also be applied to the case that the communication specification varies according to a vehicle standard. That is, when the communication specification varies according to the vehicle standard, the battery 20 may switch the communication specification according to the vehicle standard.

(4) In the first to fourth embodiments, the processing of switching the communication specifications is performed during the vehicle starting. Alternatively, the switching timing of the communication specification may be other than during the vehicle starting, such as immediately after the battery replacement.

(5) In the first to fourth embodiments, the communication specification is discriminated from the difference of the pulse width or the number of pulses of the signals. Alternatively, for example, the communication specification may be discriminated by physical means other than the signal, such as the number of communication connector pins. In the first embodiment, the starting signal having the different pulse width is output from the vehicle to the battery during the vehicle starting the vehicle according to the communication specification. Alternatively, the starting signal having the different number of pulses may be output according to the communication specification.

(6) In the fourth embodiment, by way of example, after the switching of the communication specification, the charge control of the battery 20 performed by the vehicle ECU using the LIN communication is specified, and the state of the battery 20 is monitored according to the specified charge control. Additionally, as long as the state of the battery 20 is monitored according to some sort of control performed by the vehicle, any method can be adapted to the monitoring of the state of the battery 20, but the monitoring of the state of the battery 20 is not limited to the charge control.

(7) The vehicle 1 is not limited to a passenger car, but can be applied to any vehicle such as a motorcycle, a three-wheeled vehicle, and a truck.

(8) The battery 20 may be used for a battery that starts the engine, applied to both of two batteries in the vehicle including the two batteries, or applied to one of the two batteries.

(9) The voltage at the battery 20 may be 12V, 24V, or 48V, and be set to any voltage as necessary.

DESCRIPTION OF REFERENCE SIGNS

1: automobile
10B: vehicle ECU (an example of "control device" of the present invention)
20: battery
30: assembled battery
31: secondary battery (an example of "energy storage device" of the present invention)
41: current sensor
45: current cutoff device
50: management device
60: voltage detection circuit
70: data processor
73: memory

The invention claimed is:

1. A vehicle communication system comprising:
a control device provided in a vehicle; and
a management device that is provided in a battery mounted on the vehicle while communicably connected to the control device,
wherein one of the control device and the management device discriminates a communication specification of the other, and switches the communication specification, and
wherein one of the control device and the management device discriminates the communication specification based on a discrimination signal output from the other.

2. The vehicle communication system according to claim 1, wherein the discrimination signal is a signal having a different pulse width or a different number of pulses according to the communication specification.

3. The vehicle communication system according to claim 1, wherein the management device discriminates the communication specification of the vehicle based on the discrimination signal output from the control device of the vehicle, and switches the communication specification.

4. The vehicle communication system according to claim 3, wherein the control device transmits a starting signal to the management device during vehicle starting, and
the starting signal is the discrimination signal of the pulse width or the number of pulses according to the communication specification of the vehicle.

5. The vehicle communication system according to claim 3, wherein the management device switches a monitoring mode of the battery from a pause mode to a normal mode on condition that the management device receives a starting signal output from the control device during vehicle starting, and
the control device transmits the discrimination signal to the management device later than transmission timing of the starting signal.

6. The vehicle communication system according to claim 3, wherein after the communication specification is switched, the management device specifies control performed by the vehicle in data communication with the control device, and monitors a state of the battery according to a specified control content.

7. A management device for a battery mounted on a vehicle, wherein the management device for the battery is communicably connected to a control device provided in the vehicle, discriminates the communication specification of the vehicle, and switches the communication specification, wherein one of the control device and the management device discriminates the communication specification based on a discrimination signal output from the other.

8. A circuit board comprising the management device for the battery according to claim 7.

9. A battery comprising: an energy storage device; and the circuit board according to claim 8.

10. A method for switching a communication specification applied to a vehicle communication system, wherein the vehicle communication system includes:

a control device provided in the vehicle; and a management device that is provided in a battery mounted on the vehicle while communicably connected to the control device, and one of the control device and the management device discriminates a communication specification of the other, and switches the communication specification wherein one of the control device and the management device discriminates the communication specification based on a discrimination signal output from the other.

* * * * *